(12) United States Patent
Baus

(10) Patent No.: US 11,542,977 B2
(45) Date of Patent: Jan. 3, 2023

(54) SELF-LOCKING PIN

(71) Applicant: PIVOT POINT, INCORPORATED, Hustisford, WI (US)

(72) Inventor: Roman J Baus, Rubicon, WI (US)

(73) Assignee: PIVOT POINT INCORPORATED, Hustisford, WI (US)

( * ) Notice: Subject to any disclaimer, the term of this patent is extended or adjusted under 35 U.S.C. 154(b) by 329 days.

(21) Appl. No.: 16/999,717

(22) Filed: Aug. 21, 2020

(65) Prior Publication Data

US 2022/0056939 A1    Feb. 24, 2022

(51) Int. Cl.
*F16B 21/12* (2006.01)
*F16B 19/10* (2006.01)
*F16B 7/10* (2006.01)

(52) U.S. Cl.
CPC .......... *F16B 21/125* (2013.01); *F16B 19/109* (2013.01); *F16B 7/105* (2013.01)

(58) Field of Classification Search
CPC ...... F16B 21/125; F16B 19/109; F16B 7/105; Y10T 403/32483; Y10T 403/32508
USPC ......................................................... 411/347
See application file for complete search history.

(56) References Cited

U.S. PATENT DOCUMENTS

| | | | |
|---|---|---|---|
| 349,004 A | 9/1886 | Renshaw et al. | |
| 757,838 A * | 4/1904 | Pfleghar | F16B 21/086 |
| | | | 24/627 |
| 1,852,785 A * | 4/1932 | Moehler | F21V 19/00 |
| | | | 403/109.3 |
| 3,645,160 A * | 2/1972 | Artioli | F16B 2/248 |
| | | | 411/347 |
| 6,230,456 B1 * | 5/2001 | Merchlewitz | E06B 3/685 |
| | | | 411/908 |
| 6,568,894 B2 | 5/2003 | Golden et al. | |
| 6,872,039 B2 * | 3/2005 | Baus | F16B 21/125 |
| | | | 411/347 |
| 7,373,793 B2 | 5/2008 | Choi | |
| 8,555,481 B2 | 10/2013 | Porter et al. | |
| 9,024,188 B2 | 5/2015 | Lacey, Jr. et al. | |
| 9,199,619 B2 | 12/2015 | Neumann et al. | |
| 9,255,501 B2 | 2/2016 | Esposito | |
| 9,999,271 B2 | 6/2018 | Reda | |
| 10,589,362 B2 | 3/2020 | Shimmura | |
| 2006/0002759 A1 * | 1/2006 | Blackman | F16B 7/18 |
| | | | 403/109.3 |
| 2007/0243042 A1 | 10/2007 | Baus | |
| 2016/0076572 A1 | 3/2016 | O'Dell | |
| 2018/0087554 A1 | 3/2018 | Dreher et al. | |
| 2018/0156256 A1 | 6/2018 | Okumura | |

* cited by examiner

*Primary Examiner* — Flemming Saether
(74) *Attorney, Agent, or Firm* — Ryan Kromholz & Manion, S.C.

(57) ABSTRACT

A self-locking pin having a shaft, a headed end, and plunger biased in a bore in the pin. The portion of the detent or plunger that extends outwardly from the bore may be wedge-shaped, or possess other geometrical shapes, while the portion of the plunger disposed inside the bore is of a cylindrical shape or other geometrical shapes. The plunger comprises a plunger section and a biasing section in a unitary one-piece construction. At least one transition ledge is defined on the plunger. The shaft is staked at points along the perimeter of the bore so that the inwardly extending surface created by the staking abuts the transition ledge and prevents the plunger from rotating or being removed from the bore.

18 Claims, 6 Drawing Sheets

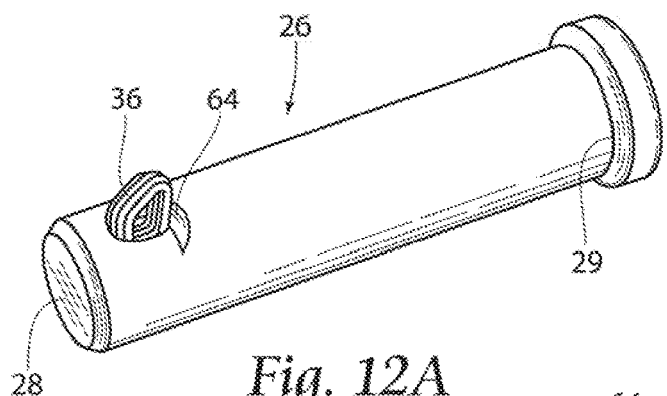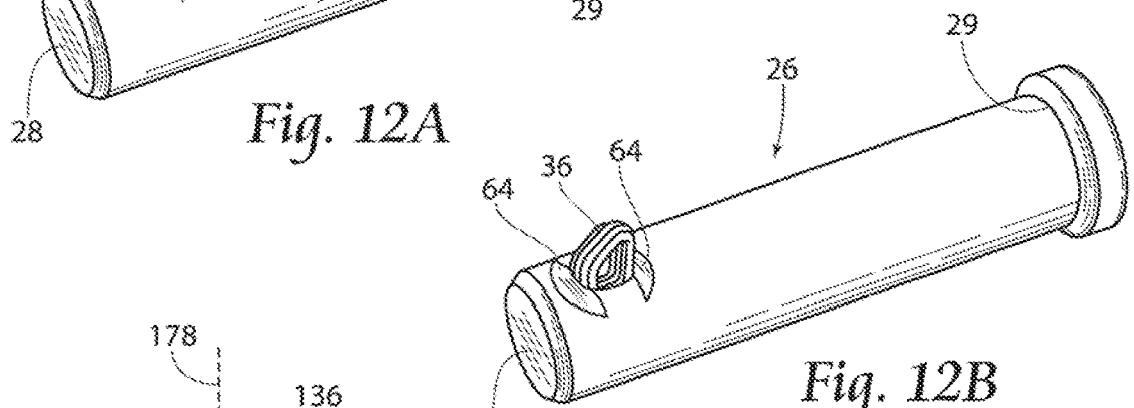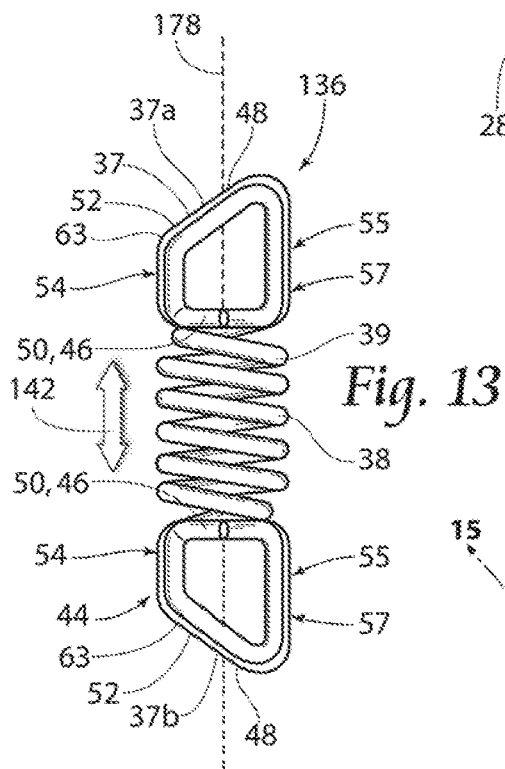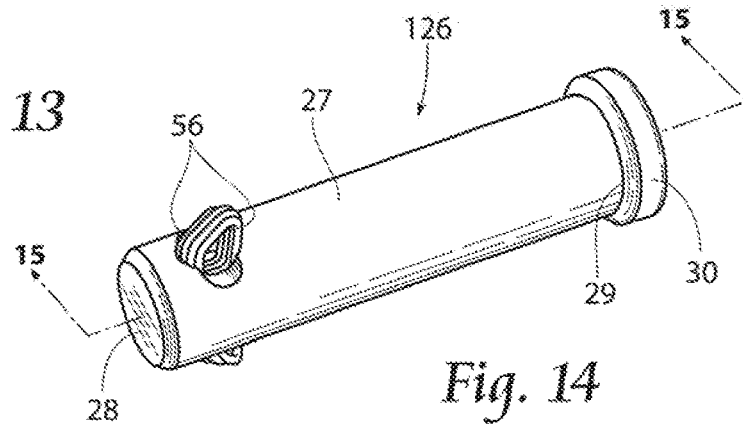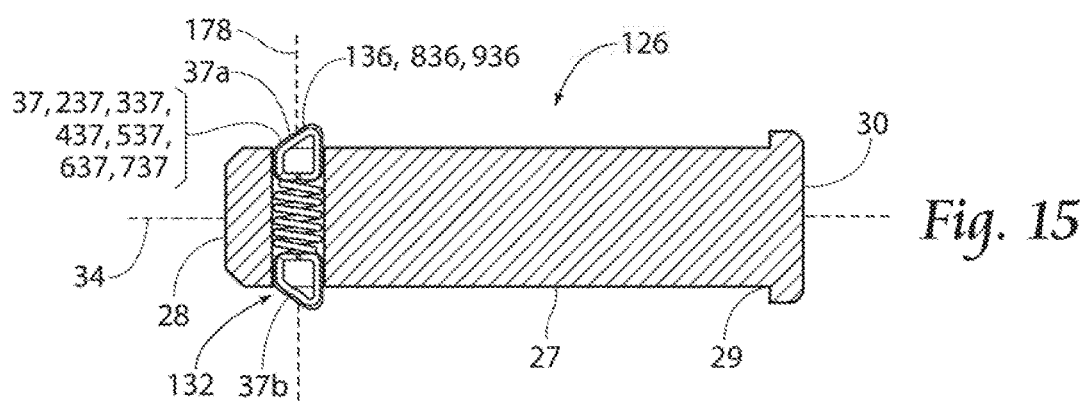

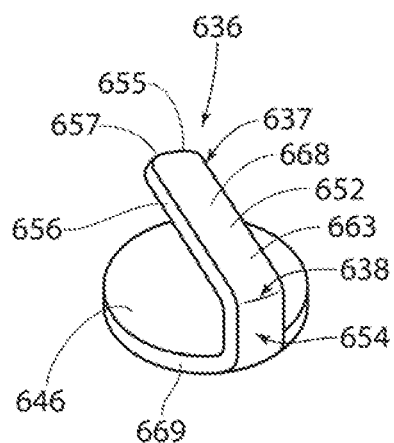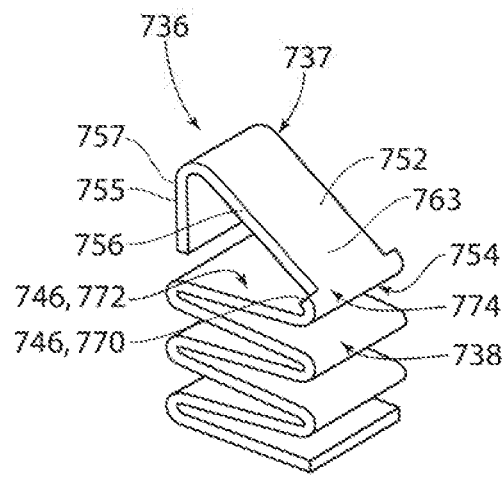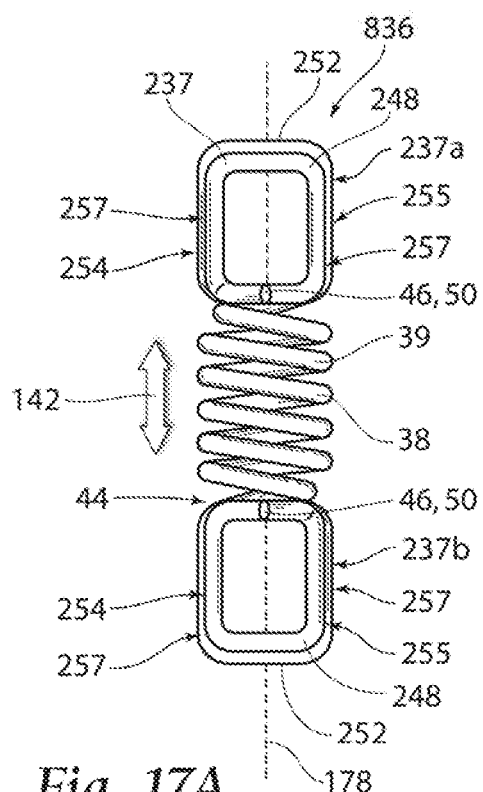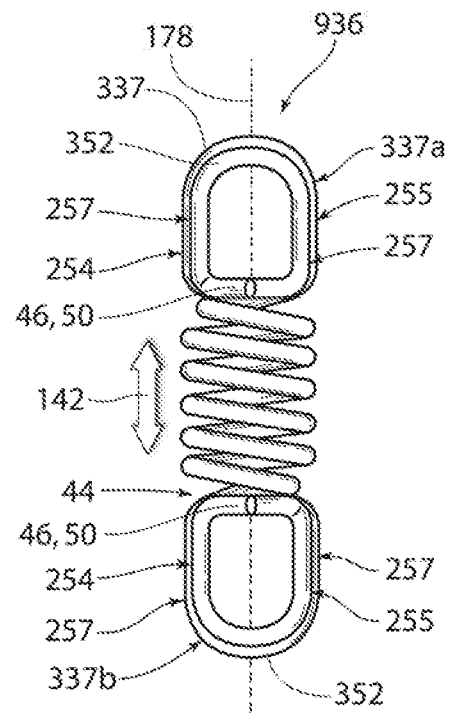

ated with the plunger section and the biasing section are a unitary one piece construction.

SELF-LOCKING PIN

BACKGROUND OF THE INVENTION

The invention relates to fasteners, namely threadless fasteners and more particularly to a threadless fastener for retaining two or more structures through apertures formed in each structure.

Detent pins are well known in industry. Many of these pins fall into the category of safety bolts. Safety bolts have a threaded end to which a nut can be attached to as well as a detent mechanism along the length of the bolt. The main fastening mechanism in safety bolts is threading the nut on the end of the bolt. These products are often used in the aircraft industry so an extra safety factor is present in case vibrations cause the nut to loosen or someone forgets to tighten the nut. The detent mechanism is this extra safety factor. However, these dual fasteners make safety bolts more difficult and thus more expensive to manufacture. Additionally there are some applications where such a bolt cannot be used because it is either impractical or impossible to access the threaded end of the bolt after it is inserted through an aperture. Also, screwing the nut on the end of the bolt causes an increase in assembly time.

Cotter pins are also well known in industry. A bolt with a cotter way is inserted through an aperture. A cotter pin is then inserted through the cotter way so the bolt cannot be removed from the aperture. It is thus obvious that access to the backside of the workpiece is necessary for a cotter pin to be utilized. Here again, insertion of the cotter pin in the cotter way is an extra step that will take more time during assembly.

There has been a need in the market for a self-locking pin which is simple to manufacture and can be installed with little effort and in applications where there is no access to the opposing side of the workpiece and thus a nut cannot be applied to the threaded end of a pin. Such self-locking pins have comprised a three piece design consisting of a pin having a bore. A separate spring and plunger are in contact with one another within the bore, where compression and extension of the spring moves the plunger.

There is a need in the market to minimize both cost and the number of component parts of a self-locking pin. Therefore, there is a need in the market for a self-locking pin comprising of two pieces, a pin and a plunger unit housed within a bore of the pin. In particular a two piece construction in which the plunger unit extends orthogonal to a longitudinal axis of the pin.

SUMMARY OF THE INVENTION

The present invention, a self-locking pin, with a unitary one-piece construction plunger having a plunger section and a biasing section. The unitary one-piece construction of the plunger facilitates easy installation of the pin through an aperture in an object. In addition, the unitary one piece construction of the plunger optimizes costs associated with the self-locking pin.

In an embodiment of the self-locking pin, the self-locking pin comprises an elongated shaft. At least one cylindrical re-entrant bore intersects the shaft. At least one plunger is positioned within the bore. The plunger comprises at least one plunger section and a biasing section. The plunger comprises a longitudinal axis at least substantially orthogonal to a longitudinal axis of the pin. The plunger section and the biasing section are a unitary one piece construction.

The self-locking pin further comprises the biasing section provides for a compression of the biasing section orthogonal to the longitudinal axis of the pin.

The self-locking pin further comprises a first end and a second end. The second end may have an enlarged head portion.

The self-locking pin further comprises the plunger section having at least one of a wedge shape, a square shape, a rectangular shape and a parabolic shape extendable out of the bore. The plunger section may comprise any polygonal shape.

The self-locking pin further comprises the biasing section disposed in the re-entrant bore, and biases the plunger section outwardly of the bore.

The self-locking pin further comprising the shaft is staked on at least one side of an entrance of the bore to provide a marginal surface extending angularly relative to the longitudinal axis of the pin, and further engagable with the plunger to thereby restrain the plunger from at least one of a rotation within the bore and an extraction from the bore.

The self-locking pin having at least one plunger wherein the plunger comprises a wire having a first helical winding to provide for the biasing section, and a second helical winding at least substantially orthogonal to the biasing section at at least one end of the wire to provide for the plunger section. In alternative embodiments of the plunger, the plunger may comprise at least one of a spring steel, a stamping or a composite material.

In a subsequent embodiment of the plunger of the self-locking pin, the plunger may have two oppositely opposed plunger sections separated by the biasing section, wherein the pin has oppositely opposed entrances to the bore for re-entrant of the two plunger sections.

BRIEF DESCRIPTION OF THE DRAWINGS

FIG. 12A is a perspective view of the pin according to the present invention, illustrating a stake behind the plunger.

FIG. 12B is a perspective view of the pin according to the present invention, illustrating a pair of stakes placed in front of and behind the plunger.

FIG. 13 is a side elevation view of a second embodiment of the plunger.

FIG. 14 is a perspective view of an alternative embodiment of the pin according to the present invention, applying a second embodiment of the plunger.

FIG. 15 is a cross sectional view of the alternative embodiment of the pin according to the present invention taken along line 15-15 of FIG. 14.

FIG. 16E is a perspective view of a seventh embodiment of the plunger.

FIG. 16F is a perspective view of an eighth embodiment of the plunger.

FIG. 17A is a side elevation view of a ninth embodiment of the plunger.

FIG. 17B is a side elevation view of a tenth embodiment of the plunger.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
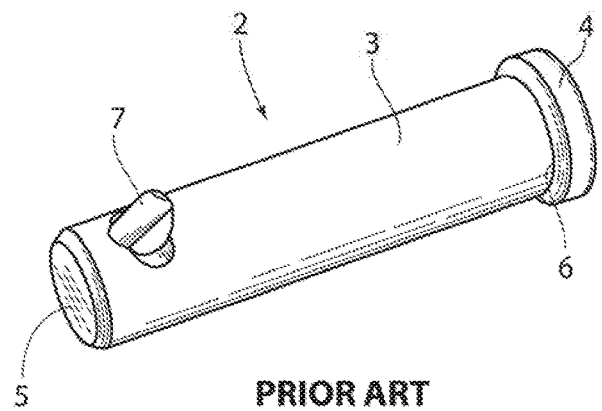
FIG. 1 is a perspective view of a first prior art pin.
Figure 2:
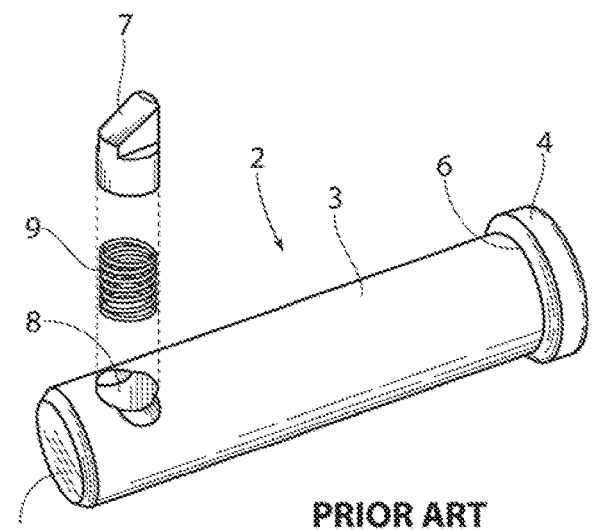
FIG. 2 is an exploded perspective view of the first prior art pin.

With reference to FIGS. 1 and 2, a first prior art pin 2 is illustrated. The first prior art pin 2 comprises a cylindrical shaft 3 having a first end 5 and a second end 6. A head 4 is positioned at the second end 6.

As illustrated in FIG. 2, a bore 8 extends partway through the shaft 3 in close proximity to the first end 5. A plunger 7 is slidably disposed in the bore 8. The plunger 7 sits on a coil spring 9, where the plunger 7 and the coil spring 9 are two separate components of the pin 2.

Figure 3A:
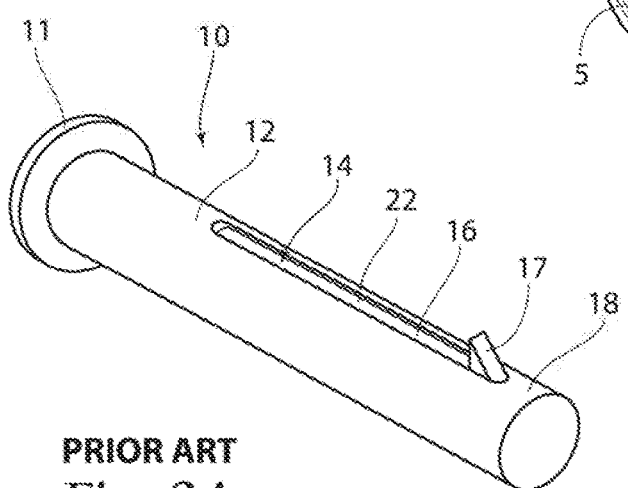
FIG. 3A is a perspective view of a second prior art pin.
Figure 3B:
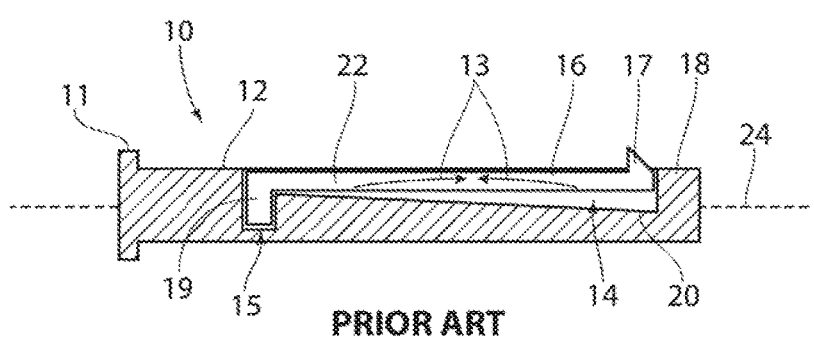
FIG. 3B is a cross sectional view of the second prior art pin.

With reference to FIGS. 3A and 3B, a second prior art pin 10 is illustrated. The second prior art pin 10 comprises a second prior art head 11 with a second prior art shaft 12 extending from the head 11. The shaft 12 has an open longitudinally-extending long, narrow open slot 14. The slot 14 accommodates a longitudinally-extending long narrow detent spring 16. The spring 16 comprises an anchor leg 19 and a detent 17 separated by a spring shaft 22. The detent 17 is disposed at the distal end 18 of the shaft 12. The spring shaft 22 is longitudinally extending within the slot 14. The anchor leg 19 is positioned towards a proximal end of the pin 10. The anchor leg 19 is anchored in an anchor well 15 of the shaft 12. The pin 10 operates by moving the detent 17 in the direction of a slot base 20 of the slot 14. In doing so the spring shaft 22 of the spring 16 compresses longitudinally and parallel 13 to the longitudinal axis 24 of the shaft 22.

Figure 4:
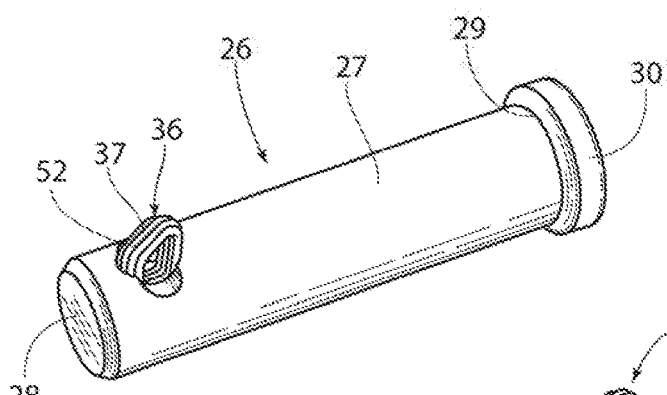
FIG. 4 is a perspective view of a pin according to the present invention.

With attention to FIG. 4, the presently preferred embodiment of the self-locking pin 26 according to the invention is illustrated. The pin 26 has a generally cylindrical shaft 27 with a first end 28 and a second end 29. The second end 29 may have an enlarged head 30.

Figure 5:
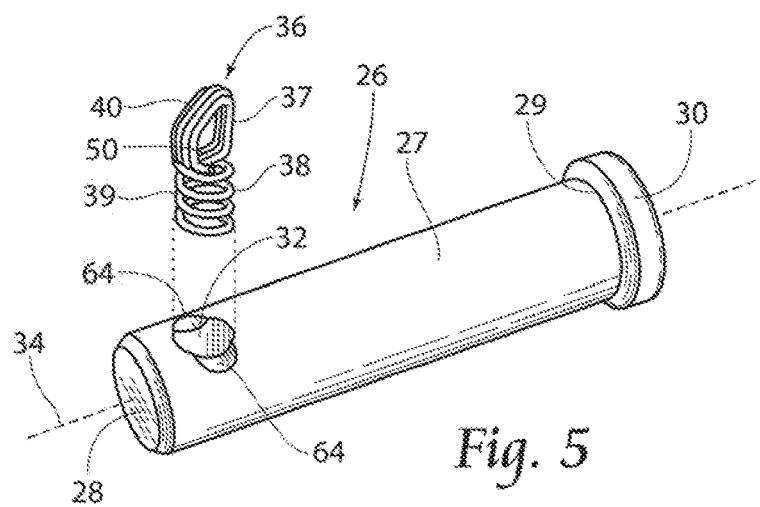
FIG. 5 is an exploded perspective view of the pin according to the present invention, illustrating a first embodiment of the plunger.

With attention to FIG. 5, a re-entrant bore 32 extends partway thru the shaft 27 near the first end 28. The bore 32 extends radially inwardly towards a central longitudinal axis 34 of the shaft 27. The bore 32 may or may not intersect the central longitudinal axis 34 of the shaft 27. A plunger 36 is slidably disposed in the bore 32. The plunger 36 comprises a plunger section 37 and a biasing section 38 in unitary one-piece construction. As illustrated, a first embodiment of the plunger 36 provides for the plunger 36 as a wire 39 helically wound to provide for the biasing section 38. Proximal to a spring end 50, the wire 39 is helically wound in a second winding 40, helically wound at least substantially orthogonal to the helical winding of the biasing section 38.

Figure 6A:
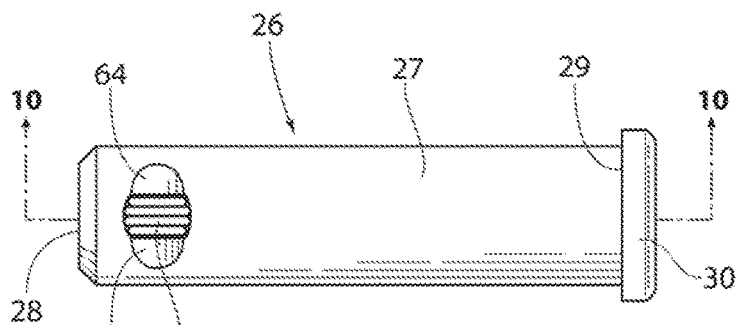
FIG. 6A is a top plan view of the pin according to the present invention.
Figure 6B:
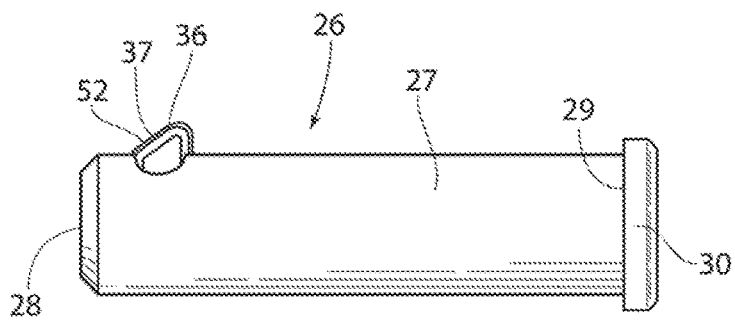
FIG. 6B is a side elevation view of the pin according to the present invention.
Figure 6C:
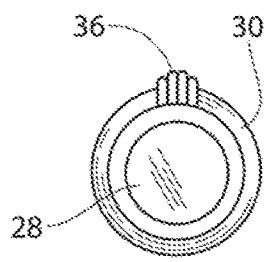
FIG. 6C is an end elevation view of the pin according to the present invention.

FIGS. 6A, 6B, and 6C, show views of the pin 26 from the top, side, and end respectively.

Figure 7:
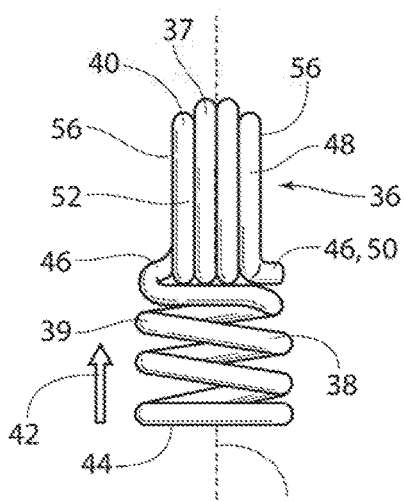
FIG. 7 is a front elevation view of the first embodiment of the plunger.
Figure 8:
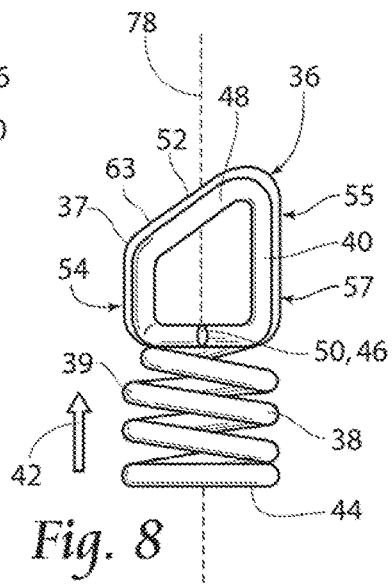
FIG. 8 is a side elevation view of the first embodiment of the plunger.
Figure 9:
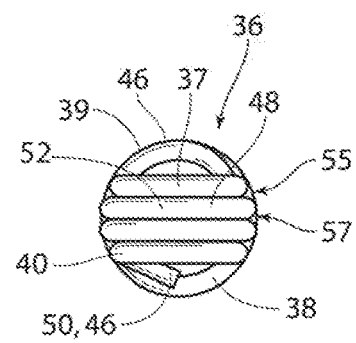
FIG. 9 is a top plan view of the first embodiment of the plunger.

With attention to FIGS. 7, 8 and 9 the first embodiment, preferred embodiment, of the plunger 36 is illustrated. The helical winding of the biasing section 38 extends in a first direction 42 from a plunger base 44 to a transition ledge 46. It is observed the first direction 42 is at least substantially parallel to a longitudinal axis of the plunger 78, which extends from the base 44 to the plunger section 37. The transition ledge 46 comprises the final winding of the biasing section 38 and the respective spring end 50. The final winding of the biasing section 38 and the respective spring end 50, both comprising the transition ledge 46, are separated by the second spring section 48. At the transition ledge 46, the second spring section 48 of the wire 39 is at least substantially positioned orthogonal to the transition ledge 46. The second spring section 46 is proximate to the spring end 50. The second section 48 is wound in a helical pattern to create the second winding 40. The windings of the helical pattern of the second winding 40 are at least substantial parallel to one another and at least substantially proximate to one another. Preferably the helical windings of the second winding 40 are in contact with one another. The helical windings of the second winding 40 are oriented to provide for a wedge having a substantially planar surface 52. The planar surface 52 is sloped over its length away from the biasing section 38.

Figure 10:
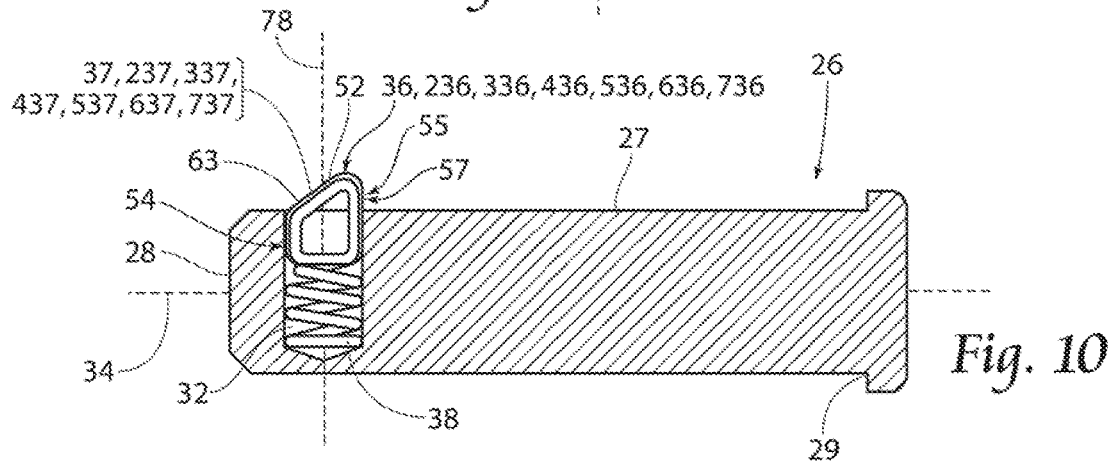
FIG. 10 is a cross sectional view of the pin according to the present invention taken along line 10-10 of FIG. 6A.

As will be described hereinafter, the transition ledge 46 helps retain the plunger 36 in the bore 32. Referring to FIGS. 8 and 10, the side of the plunger section 37 proximate to the first end 28 of the pin 26 is a plunger section leading side 54. The side of the plunger section 37 proximate to the second end 29 of the pin 26 is the plunger section trailing side 55. The planar surface 52 is preferably positioned between the leading side 54 and the trail side 55. As seen in FIG. 7, the plunger section 37 also has oppositely disposed lateral sides 56. In the preferred embodiment, the transition ledges 46 extend from each of the lateral sides 56 of the plunger section 37 and plunger 36 itself. An abutment 57 may be formed on the side opposite leading side 54 as shown in FIGS. 8 and 9.

With attention to FIG. 10, a cross section of the pin 26 is shown. This illustrates the biasing section 38 of the plunger 36 biasing the plunger section 37. While the preferred embodiment uses a helical coil spring as described, other acceptable configurations, and biasing means, of the plunger 36 shall be described. It is observed that when the plunger 36 is inserted in the bore 32, the longitudinal axis of the plunger 78 is at least substantially orthogonal to a longitudinal axis 34 of the pin 26. The plunger section 37 of the plunger 36 is oriented to extend out of the bore 32.

As can be best seen in FIGS. 4, 6B and 10, when the plunger 36, specifically the plunger section 37, is in its normal position in the bore 32, the planar surface 52 extends above the surface of the shaft 27. Referring to FIGS. 8 and 10, the plunger section leading side 54 of the plunger section 37 is proximate the surface of the shaft 27. The planar surface 52 of the plunger section 37, the plunger 36, extends angularly upwardly away from the surface of the shaft 27 to define a ramped engaging surface 63, and where applicable the abutment 57. The abutment 57 is perpendicular or normal, or at least substantially perpendicular, to the axis 34 of the shaft 27 and faces the direction of the second end 29. The plunger 36 could be made from any suitable materials such as, but not limited to, alloy steels, carbon steels, stainless steel, or aluminum alloys as shall be discussed.

To assemble the self-locking pin 26, the plunger 36 is placed in the re-entrant bore 32. The pin 26 is held in place, with the plunger 36 in its depressed position, by one tool while another tool punches the shaft 27 using a radius stake punch perpendicular to the pin 26. The staking 64, reference FIGS. 5 and 6A, causes a change in the shape of the shaft 27 around the entrance to the bore 32. The smooth round bore 32 is formed to a substantially oval shape with some depth as best shown in FIG. 5. In the preferred embodiment, the shaft 27 is staked on the lateral sides of the plunger, which extend angularly relative to the longitudinal axis 34. The staking 64 forms inwardly extending marginal portions. This is best shown in FIG. 5. These inwardly extending portions abut the transition ledge 46 of the plunger 36 (reference FIGS. 7 through 9) as the biasing section 38 of the plunger 36 urges the plunger section 37 of the plunger 36 outwardly of the bore 32. The edge of the staking 64 abuts the transition ledge 46, and lateral sides 56 where applicable, of the plunger 36 and prevents the plunger 36 from rotating within the bore or being removed from the bore 32. Alternately, and as shown in FIGS. 12A and 12B respectively, a single stake 64 may be placed behind the plunger 36 or a pair of stakes 64 may be placed in front of the plunger 36, proximal to the first side 28, and behind the plunger 36, proximal to the second side 29.

Figure 11:
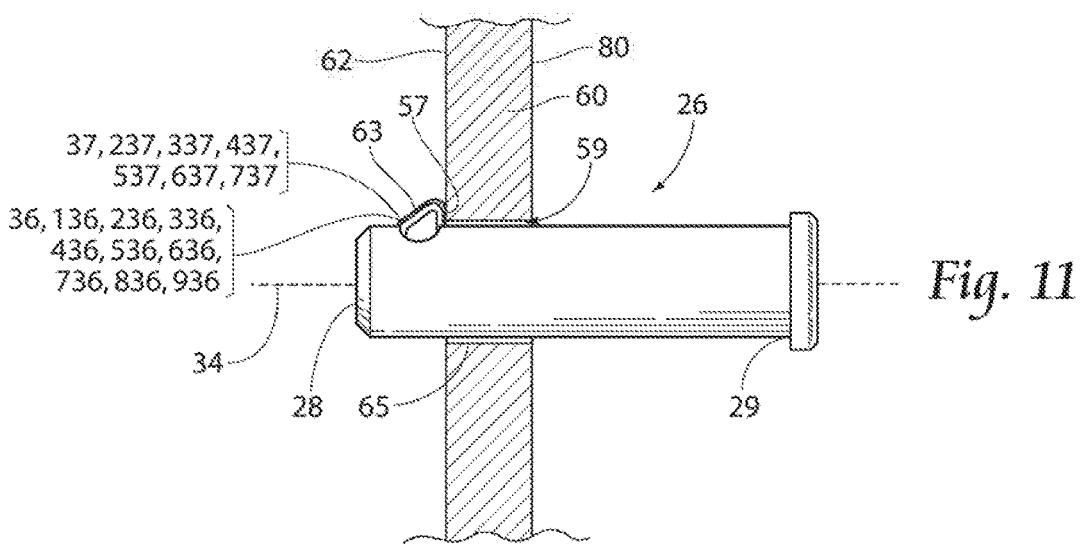
FIG. 11 is a side elevation view of the pin according to the present invention installed in an aperture through an object.

With attention to FIG. 11, the self-locking pin 26 is illustrated as inserted through an aperture 59. In regular use, the self-locking pin 26 is inserted through the aperture 59 in at least one object 60 with a restraining surface 62. The ramped engaging surface 63 of the plunger 36, plunger section 37, abuts the inner surface 65 of the aperture 59. The force of the inner surface 65 of the aperture 59 against the ramped engaging surface 63 of the plunger 36 causes the plunger section 37 to be pushed inwardly against the bias of the biasing section 38, not illustrated in the figure, into the bore 32, not illustrated in the figure, until either or both of the ramped engaging surface 63 and the abutment 57 are no longer exposed. The plunger 36 advances at least substantially perpendicular to the longitudinal axis 34, thru compression of the biasing section 38 at least substantially orthogonal to the longitudinal axis 34. The pin 26 can then be installed completely by continuing to push the pin 26 through the aperture 59. Once the pin 26 is installed and the ramped engaging surface 63 clears the aperture 59, the plunger section 37 of plunger 36 pops back up against the bias of the spring section 38, not illustrated in the figure, of the plunger 36. As shown in FIG. 11, the abutment 57 of the plunger section 37, plunger 36, abuts the restraining surface 62 of the object 60, preventing the pin 26 from being withdrawn from the aperture 59 in a similar manner.

With attention to FIG. 13 a second embodiment, of the plunger 136 is illustrated. The second embodiment of the plunger 136 may incorporate at least one feature of the first embodiment of the plunger 36. The second embodiment 136 comprises a first plunger section 37a having at least one of the features of the plunger section 37 of the first embodiment 36. Further in the second embodiment 136 the plunger base 44 provides for a second plunger section 37b having at least one of the features of the first plunger section 37a, positioned opposite the first plunger section 37a along a plunger travel direction 142. The plunger travel direction 142 illustrates the respective line of travel of the first plunger section 37a and the second plunger section 37b when in operation in an alternate embodiment of the self-locking pin 126, reference FIGS. 14 and 15 for the alternate embodiment of the self-locking pin 126. It is observed the plunger travel direction 142 is at least substantially parallel to a longitudinal axis of the plunger 178, which extends from the first plunger section 37a to the second plunger section 37b. The second embodiment of the plunger 136 may incorporate at least one feature of at least one of the ninth embodiment of the plunger 836 or the tenth embodiment of the plunger 936.

With attention to FIGS. 14 and 15, the alternate embodiment of the self-locking pin 126 is illustrated in which at least one of the second embodiment of the plunger 136, the ninth embodiment of the plunger 836, or the tenth embodiment of the plunger 936 is utilized. The alternative embodiment of the self-locking pin 126 incorporates at least one feature of the self-locking pin 26. As shown in FIGS. 14 and 15, the plunger 136 is disposed in at least one thru bore 132. Wherein the thru bore 132 incorporates at least one feature of the bore 32. The shaft 27 is staked on the lateral sides 56 of each plunger section (37a, 37b).

As illustrated in FIG. 15, it is observed that when the plunger 136 is inserted in the bore 132, the longitudinal axis of the plunger 178 is at least substantially orthogonal to a longitudinal axis 34 of the pin 126. The plunger section(s) (37, 37a, 37b) of the plunger 136 are oriented to extend out of the bore 132).

Figure 16A:
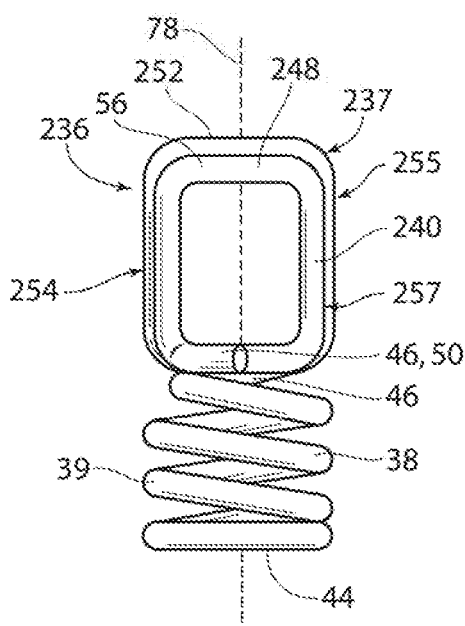
FIG. 16A is a side elevation view of a third embodiment of the plunger.

With attention to FIG. 16A a third embodiment of the plunger 236 is illustrated. It is observed the third embodiment of the plunger 236 may incorporate at least one feature of the first embodiment of the plunger 36. It is observed the plunger 236 comprises a plunger section 237 and a biasing section 38 in relationship as described in the first embodiment of the plunger 36. It is observed, the plunger section 237 of the plunger 236 is comprised from a second spring section 248 of the spring 39 making the plunger 236. The second spring section 248 is proximate to a spring end 50 of the spring 39 comprising the plunger 236. The second section 248 is wound in a helical pattern to create the second winding 240. The windings of the helical pattern of the second winding 240 are at least substantial parallel to one another and at least substantially proximate to one another. Preferably the helical windings of the second winding 240 are in contact with one another. The helical windings of the second winding 240 are oriented to provide for a rectangular or square shape having a substantially planar surface 252 opposite the base 44. The planar surface 252 is at least substantially horizontal.

As described in the first embodiment of the plunger 36, the transition ledge 46 helps retain the plunger 236 in the bore 32. The side of the plunger section 237 proximate to the first end 28 of the pin 26 is a plunger section leading side 254. The side of the plunger section 237 proximate to the second end 29 of the pin 26 is the plunger section trailing side 255. The leading side 254 and the trailing side 255 are each at least substantially parallel to one another and at least substantially orthogonal to the planar surface 252. The planar surface 252 is preferably positioned between the leading side 254 and the trail side 255. The plunger section 237 also has oppositely disposed lateral sides 56. In the preferred embodiment, the transition ledges 46 extend from each of the lateral sides 56 of the plunger section 237 and plunger 236 itself. An abutment 257, similar to the abutment 57 of the first embodiment of the plunger 36, may be formed on each of the leading side 254 and the trailing side 255. The planar surface 252 behaves in a similar manner to the planar surface 52 and ramped engaging surface 63, when the pin 26 is inserted in, and removed from, the aperture 59. The plunger section 237 allows for the plunger 236 to abut the restraining surface 62, and alternatively the surface opposite the restraining surface 80 (reference FIG. 11), of the object 60, preventing the pin 26 from being withdrawn from the aperture 59 in either direction, towards the first end 28 or towards the second end 29.

As illustrated in FIG. 10, it is observed that when the plunger 236 is inserted in the bore 32, the longitudinal axis of the plunger 78 is at least substantially orthogonal to a longitudinal axis 34 of the pin 26. The plunger section 237 of the plunger 236 is oriented to extend out of the bore 32, reference FIG. 10.

Figure 16B:
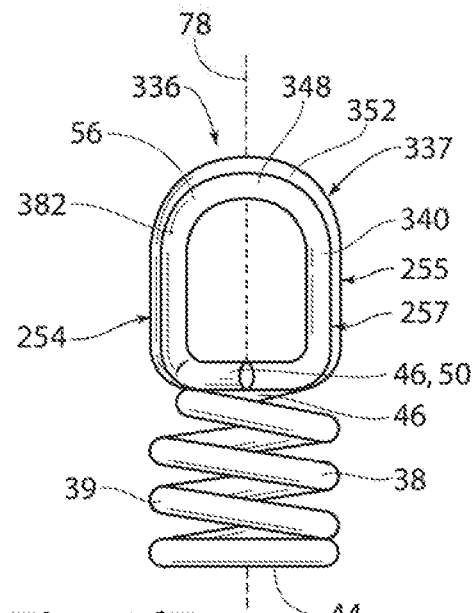
FIG. 16B is a side elevation view of a fourth embodiment of the plunger.

With attention to FIG. 16B a fourth embodiment of the plunger 336 is illustrated. It is observed the fourth embodiment of the plunger 336 may incorporate at least one feature of at least one of the first embodiment of the plunger 36 or the third embodiment of the plunger 236. It is observed the plunger 336 comprises a plunger section 337 and a biasing section 38 in relationship as described in the first embodiment of the plunger 36. It is observed, the plunger section 337 of the plunger 336 is comprised from a second spring section 348 of the spring 39 making the plunger 336. The second spring section 348 is proximate to a spring end 50 of the spring 39 comprising the plunger 336. The second section 348 is wound in a helical pattern to create the second winding 340. The windings of the helical pattern of the second winding 340 are at least substantial parallel to one another and at least substantially proximate to one another. Preferably the helical windings of the second winding 340 are in contact with one another. The helical windings of the second winding 340 are oriented to provide for an arch shape 382 with the leading side 254 and trailing side 255 separated by a parabolic surface 352. Where the parabolic surface 352, acting in a manner similar to the planar surface 252, is opposite the base 44. Wherein the plunger section 337 allows for the plunger 336 to abut the restraining surface 62, and alternatively the surface opposite the restraining surface 80 (reference FIG. 11), of the object 60, preventing the pin 26 from being withdrawn from the aperture 59 in either direction, towards the first end 28 or towards the second end 29. Further, the parabolic arch of the parabolic surface 352 accommodates for the depression of the plunger section 337 which allows for insertion of the pin 26 in the aperture 59 as previously described. Such that the parabolic arch of the parabolic surface 352 behaves in a similar manner to the planar surface (52, 252) when the pin 26 is inserted in, and removed from, the aperture 59. Further, the parabolic arch of the parabolic surface 352 accommodates for a subsequent depression of the plunger section 337 and removal of the pin 26 from the aperture 59.

As illustrated in FIG. 10, it is observed that when the plunger 336 is inserted in the bore 32, the longitudinal axis of the plunger 78 is at least substantially orthogonal to a longitudinal axis 34 of the pin 26. The plunger section 337 of the plunger 336 is oriented to extend out of the bore 32, reference FIG. 10.

Figure 16C:
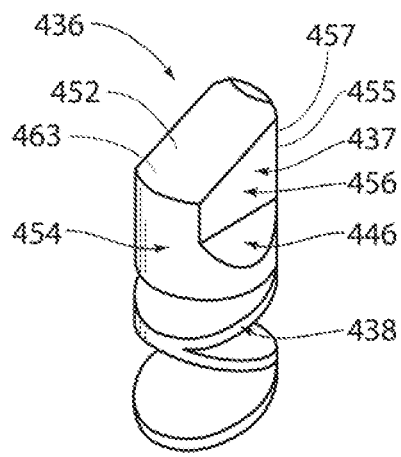
FIG. 16C is a perspective view of a fifth embodiment of the plunger.

With attention to FIG. 16C a fifth embodiment of the plunger 436 is illustrated. The fifth embodiment of the plunger 436 may be at least one of a molded metallic, molded non-metallic, or a composite plunger. It is observed the fifth embodiment of the plunger 436 may incorporate features of at least one of the first embodiment of the plunger 36, the third embodiment of the plunger 236, the fourth embodiment of the plunger 336, the sixth embodiment of the plunger 536, the seventh embodiment of the plunger 636, and the eighth embodiment of the plunger 736. The fifth embodiment of the plunger 436 provides for a biasing section 438 which operates as that of the biasing section 38, and is in communication with the a plunger section 437. The biasing section 438 comprises a series of planar discs connected to form a compressible spring feature. An abutment 457, similar to the abutment 57 of the first embodiment of the plunger 36, may be formed on the trailing side 455 of the plunger section 437. The plunger section 437 is oriented to provide for a wedge having a substantially planar surface 452. The planar surface 452 is preferably positioned between a leading side 454 and the trail side 455. The planar surface 452 is sloped over its length away from the biasing section 438. The planar surface 452 extends above the surface of the shaft 27 to define a ramped engaging surface 463. The fifth embodiment 436 may provide for transition ledges 446 extending from each of the lateral sides 456 of the plunger section 437, creating a shoulder off the lateral sides 456. Using the fifth embodiment of the plunger 436, the plunger 436 may be staked off the lateral sides 456 as illustrated in FIG. 4. It is observed the fifth embodiment of the plunger 436 may incorporate features of the second embodiment of the plunger 136. The plunger section 437 of the plunger 436 is oriented in a wedge to extend out of the bore (32, 132), reference FIGS. 10 and 15.

Figure 16D:
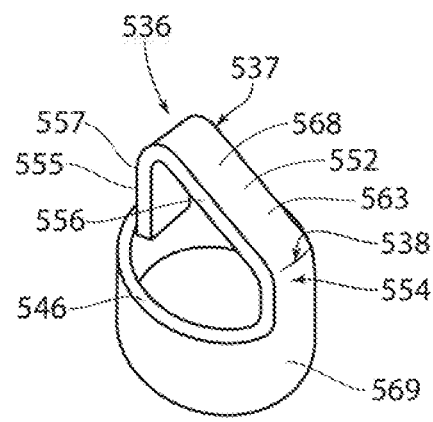
FIG. 16D is a perspective view of a six embodiment of the plunger.

With attention to FIG. 16D a sixth embodiment of the plunger 536 is illustrated. The sixth embodiment of the plunger 536 may be formed by stamping. It is observed the sixth embodiment of the plunger 536 may incorporate features of at least one of the first embodiment of the plunger 36, the third embodiment of the plunger 236, the fourth embodiment of the plunger 336, the fifth embodiment of the plunger 436, the seventh embodiment of the plunger 636, and the eighth embodiment of the plunger 736. The sixth embodiment 536 may provide for the plunger section 537 as comprising a spring arm 568. Wherein a biasing section 538 is a location providing for movement of the spring arm 568. The sixth embodiment 536 may provide for combining of elements of the biasing section 538 and the plunger section 537, such as the biasing section 538 may be positioned between the spring arm 568 and the plunger section leading side 554. The plunger section 537 is oriented to provide for a wedge having a substantially planar surface 552, which is sloped over its length. The planar surface 552 extends above the surface of the shaft 27, to define a ramped engaging surface 563.

Using the sixth embodiment of the plunger 536, the plunger 536 may be staked at the transition ledge 546 between the plunger section 537/the biasing section 538 combination and a base mount 569, thus allowing for staking of the lateral sides 556, similar to that in FIG. 4. The transition ledge 546 continues towards the plunger section trailing side 555 allowing for staking towards the rear of the plunger 536, similar to that in FIG. 12A. An abutment 557, functionally similar to the abutment 57 of the first embodiment of the plunger 36, may be formed on the trailing side 555. It is observed the sixth embodiment of the plunger 536 may incorporate features of the second embodiment of the plunger 136. The plunger section 537 of the plunger 536 is oriented in a wedge to extend out of the bore (32, 132), reference FIGS. 10 and 15.

With attention to FIG. 16E, a seventh embodiment of the plunger 636 is illustrated. The seventh embodiment of the plunger 636 may be formed by stamping. It is observed the seventh embodiment of the plunger 636 may incorporate features of at least one of the first embodiment of the plunger 36, the third embodiment of the plunger 236, the fourth embodiment of the plunger 336, the fifth embodiment of the plunger 436, the sixth embodiment of the plunger 536, and the eighth embodiment of the plunger 736. The seventh embodiment 636 may provide for the plunger section 637 as comprising a spring arm 668. A biasing section 638 provides for movement of the spring arm 668. The seventh embodiment 636 may provide for combining of elements of the biasing section 638 and the plunger section 637, such as the biasing section 638 may be positioned between the spring arm 668 and the plunger section leading side 654. The plunger section 637 is oriented to provide for a wedge having a substantially planar surface 652, which is sloped over its length. The planar surface 652 extends above the surface of the shaft 27, to define a ramped engaging surface 663

Using the seventh embodiment of the plunger 636, the plunger 636 may be staked at the transition ledge 646 between the plunger section 637, the biasing section 638 and a base mount 669, thus allowing for plunger staking along the lateral sides 656, similar to that in FIG. 4. The transition ledge 646 continues towards the plunger section trailing side 655 allowing for staking towards the rear of the plunger 636, similar to that in FIG. 12A. An abutment 657, functionally similar to the abutment 57 of the first embodiment of the plunger 36, may be formed on the trailing side 655. Further, it is observed the seventh embodiment of the plunger 636 may incorporate features of the second embodiment of the plunger 136. A plunger section 637 of the plunger 636, as previously described in the other embodiments, is oriented in a wedge to extend out of the bore (32, 132), reference FIGS. 10 and 15.

With attention to FIG. 16F, an eighth embodiment of the plunger 736 is illustrated. The eighth embodiment of the plunger 736 may be a spring steel plunger. It is observed the eighth embodiment of the plunger 736 may incorporate features of at least one of the first embodiment of the plunger 36, the third embodiment of the plunger 236, the fourth embodiment of the plunger 336, the fifth embodiment of the plunger 436, the sixth embodiment of the plunger 536, and the seventh embodiment of the plunger 636. The plunger 736 comprises a plunger section 737 and biasing section 738 in communication at a plunger section leading side 754. The plunger section 737 is oriented to provide for a wedge having a substantially planar surface 752, which is sloped over its length in the direction of the trailing side 755. The planar surface 752 extends above the surface of the shaft 27, to define a ramped engaging surface 763. An abutment 757, functionally similar to the abutment 57 of the first embodiment of the plunger 36, may be formed on the trailing side 755.

The eighth embodiment 736 may provide for two areas for transition ledges 746 extending from each of the lateral sides 756 of the plunger section 737. A first transition area 770 may be found at the transition location 774 between the plunger section 737 and the biasing section 738. A second transition area 772 may be provided on the biasing section 738 prior to the transition location 774. At least one of the first transition area 770 and the second transition area 772 creates a shoulder off the lateral sides 756. Using the eighth embodiment of the plunger 736, the plunger 736 may be staked off the lateral sides 756, similar to that in FIG. 4. It is observed the eighth embodiment of the plunger 736 may incorporate features of the second embodiment of the plunger 136. Further, the plunger section 737 of the plunger 736 is oriented in a wedge to extend out of the bore (32, 132), reference FIGS. 10 and 15.

With attention to FIG. 17A a ninth embodiment of the plunger 836 is illustrated. The ninth embodiment of the plunger 836 may incorporate at least one feature of the first embodiment of the plunger 36, the second embodiment of the plunger 136, the third embodiment of the plunger 236, the fourth embodiment of the plunger 336, and the tenth embodiment of the plunger 936. The ninth embodiment 836 comprises a first plunger section 237a having at least one of the features of the plunger section 237 of the third embodiment 236. Further in the ninth embodiment 836 the plunger base 44 provides for a second plunger section 237b having at least one of the features of the first plunger section 237a, positioned opposite the first plunger section 237a along the plunger travel direction 142. The plunger travel direction 142 illustrates the respective line of travel of the first plunger section 237a and the second plunger section 237b when in operation in the alternate embodiment of the self-locking pin 126, reference FIGS. 14 and 15 for the alternate embodiment of the self-locking pin 126. It is observed the plunger travel direction 142 is at least substantially parallel to a longitudinal axis of the plunger 178, which extends from the first plunger section 237a to the second plunger section 237b. As illustrated in FIG. 15, it is observed that when the plunger 836 is inserted in the bore 132, the longitudinal axis of the plunger 178 is at least substantially orthogonal to a longitudinal axis 34 of the pin 126. Further, the plunger section (237, 237a, 237b) of the plunger 836 is oriented to extend out of the bore 132, reference FIG. 15.

With attention to FIG. 17B a tenth embodiment of the plunger 936 is illustrated. The length embodiment of the plunger 936 may incorporate at least one feature of the first embodiment of the plunger 36, the second embodiment of the plunger 136, the third embodiment of the plunger 236, the fourth embodiment of the plunger 336, and the ninth embodiment of the plunger 836. The tenth embodiment 936 comprises a first plunger section 337a having at least one of the features of the plunger section 337 of the fourth embodiment 336. Further in the tenth embodiment 936 the plunger base 44 provides for a second plunger section 337b having at least one of the features of the first plunger section 337a, positioned opposite the first plunger section 337a along the plunger travel direction 142. The plunger travel direction 142 illustrates the respective line of travel of the first plunger section 337a and the second plunger section 337b when in operation in the alternate embodiment of the self-locking pin 126, reference FIGS. 14 and 15 for the alternate embodiment of the self-locking pin 126. It is observed the plunger travel direction 142 is at least substantially parallel to a longitudinal axis of the plunger 178, which extends from the first plunger section 337a to the second plunger section 337b. As illustrated in FIG. 15, it is observed that when the plunger 936 is inserted in the bore 132, the longitudinal axis of the plunger 178 is at least substantially orthogonal to a longitudinal axis 34 of the pin 126. Further, the plunger section (337, 337a, 337b) of the plunger 936 is oriented to extend out of the bore 132, reference FIG. 15.

It is observed an intended benefit of the unitary one-piece construction of the plunger (36, 136, 236, 336, 436, 536, 636, 736, 836, 936) facilitates ease of installation of the self locking pin (26, 126) through an aperture 59 in an object. In addition, the unitary one-piece construction of the plunger (36, 136, 236, 336, 436, 536, 636, 736, 836, 936) optimizes costs associated with the self-locking pin (26, 126).

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. An improved self-locking pin of the type having an elongated shaft, in which at least one cylindrical re-entrant bore intersecting said shaft, in which at least one plunger positioned within said bore, in which said plunger having at least one plunger section and a biasing section, and in which said plunger having a longitudinal axis at least substantially orthogonal to a longitudinal axis of said pin, wherein the improvement comprises:

said plunger comprising a wire having a first helical winding to provide for said biasing section, and a second helical winding at least substantially orthogonal to said biasing section at at least one end of said wire to provide for said plunger section and said plunger section and said biasing section being a unitary one piece construction.

2. The improved self-locking pin of claim 1, wherein said biasing section provides for a compression of said biasing section orthogonal to said longitudinal axis of said pin.

3. The improved self-locking pin of claim 1, wherein said self-locking-pin has a first end and a second end.

4. The improved self-locking pin of claim 3, wherein said second end comprising an enlarged head portion.

5. The improved self-locking pin of claim 1, wherein said plunger section having at least one of a wedge shape, a square shape, a rectangular shape and a parabolic shape extendable out of said bore.

6. The improved self-locking pin of claim 1, wherein said biasing section is disposed in said re-entrant bore, and biasing said plunger section outwardly of said bore.

7. The improved self-locking pin of claim 1, wherein said shaft being staked on at least one side of an entrance of said bore to provide a marginal surface extending angularly relative to said longitudinal axis of said pin, and further engagable with said plunger to thereby restrain said plunger from at least one of a rotation within said bore and an extraction from said bore.

8. The improved self-locking pin of claim 1, wherein said plunger comprises at least one of a spring steel, a stamping and a composite material.

9. The improved self-locking pin of claim 1, further comprising said plunger having two oppositely opposed plunger sections separated by said biasing section, wherein said pin having oppositely opposed entrances to said bore for re-entrant of said two plunger sections.

10. A self-locking pin comprising:

an elongated shaft;

at least one cylindrical re-entrant bore intersecting said shaft;

at least one plunger positioned within said bore;

said plunger having at least one plunger section and a biasing section;

said plunger having a longitudinal axis substantially orthogonal to a longitudinal axis of said pin;

said plunger comprising a wire having a first helical winding to provide for said biasing section, and a second helical winding at least substantially orthogonal to said biasing section at at least one end of said wire to provide for said plunger section; and said plunger section and said biasing section being a unitary one piece construction.

11. The self-locking pin of claim 10, wherein said biasing section provides for compression of said biasing section orthogonal to said longitudinal axis of said pin.

12. The self-locking pin of claim 10, wherein said self-locking-pin has a first end and a second end.

13. The self-locking pin of claim 12, wherein said second end comprising an enlarged head portion.

14. The self-locking pin of claim 10, wherein said plunger section having at least one of a wedge shape, a square shape, a rectangular shape and a parabolic shape extendable out of said bore.

15. The self-locking pin of claim 10, wherein said biasing section is disposed in said re-entrant bore, and biasing said plunger section outwardly of said bore.

16. The self-locking pin of claim 10, wherein said shaft being staked on at least one side of an entrance of said bore to provide a marginal surface extending angularly relative to said longitudinal axis of said pin, and further engagable with said plunger to thereby restrain said plunger from at least one of a rotation within said bore and an extraction from said bore.

17. The self-locking pin of claim 10, wherein in said plunger comprises at least one of a spring steel, a stamping and a composite material.

18. The self-locking pin of claim 10, further comprising said plunger having two oppositely opposed plunger sections separated by said biasing section, wherein said pin having oppositely opposed entrances to said bore for re-entrant of said two plunger sections.

\* \* \* \* \*